Figure 1:
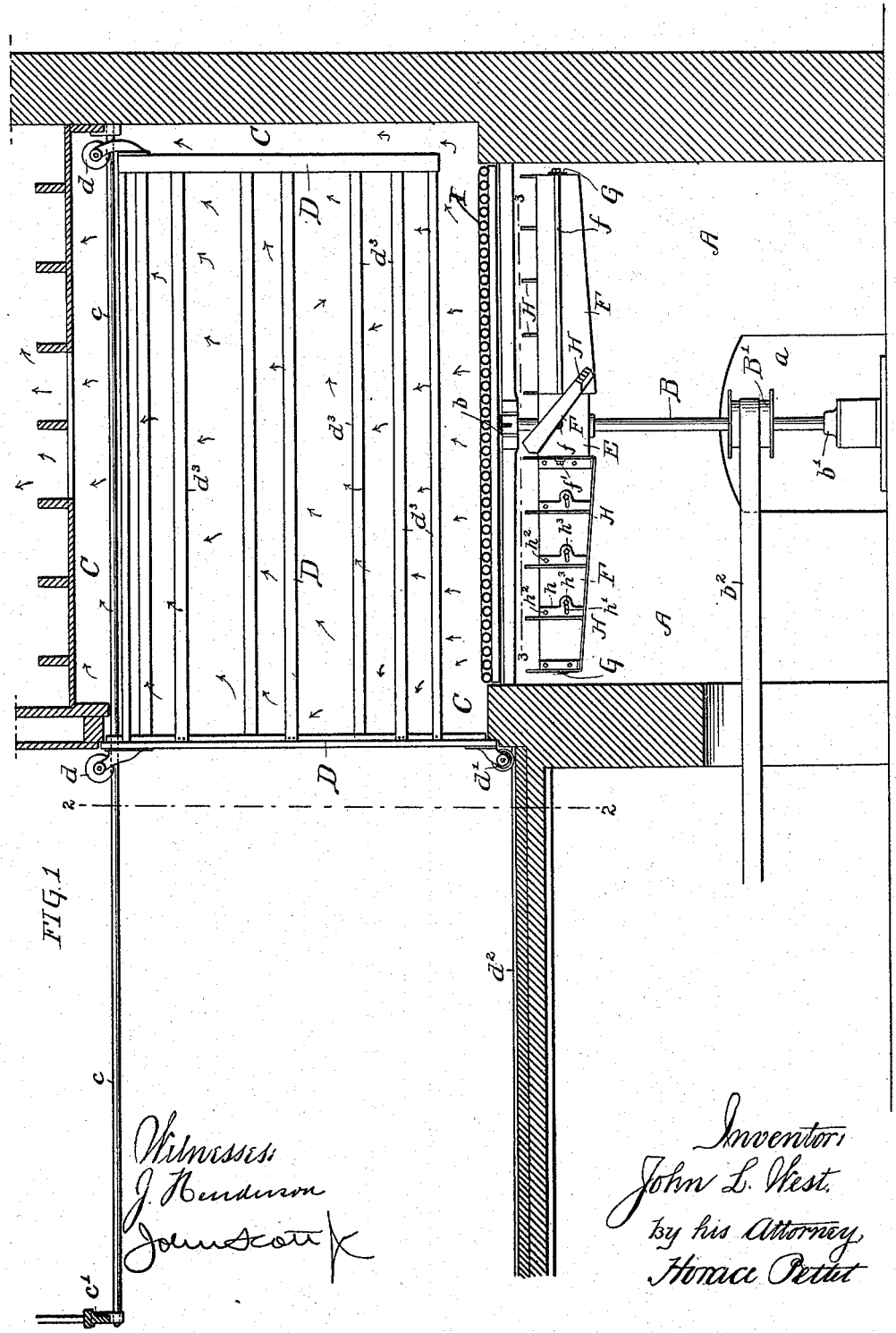

(No Model.) 3 Sheets—Sheet 1.

J. L. WEST.
APPARATUS FOR DISTRIBUTING AIR.

No. 571,500. Patented Nov. 17, 1896.

Witnesses:
J. Henderson
John Scott

Inventor:
John L. West.
by his Attorney,
Horace Pettit (No Model.) 3 Sheets—Sheet 2.
J. L. WEST.
APPARATUS FOR DISTRIBUTING AIR.
No. 571,500. Patented Nov. 17, 1896.
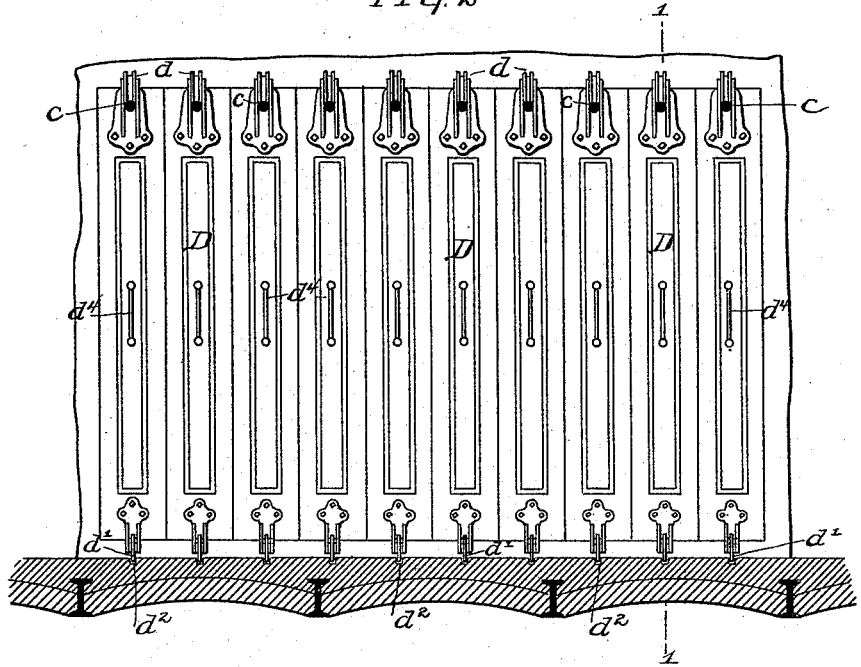
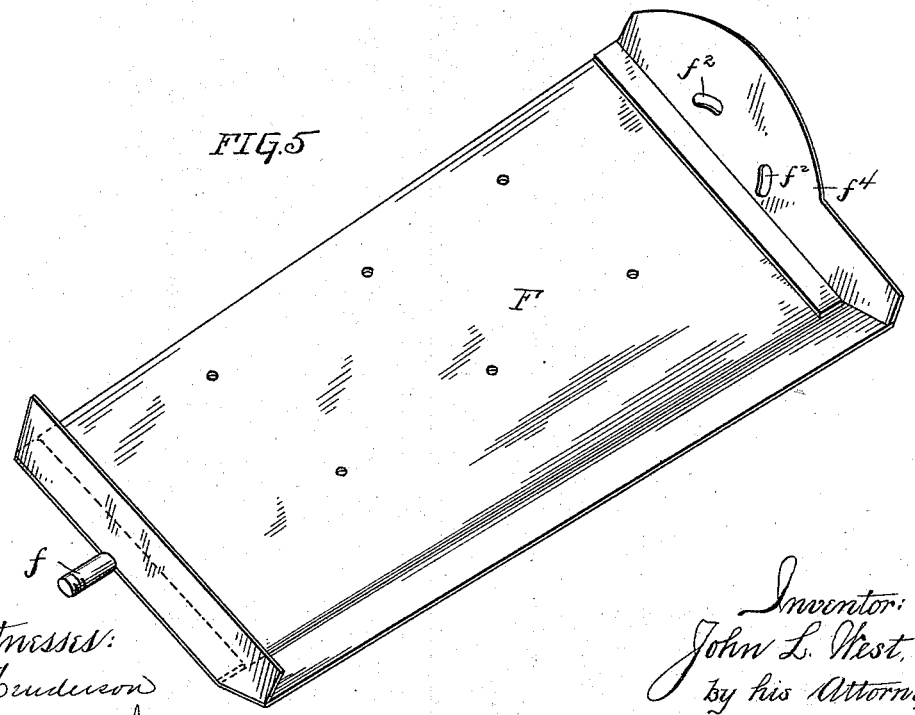

(No Model.) 3 Sheets—Sheet 3.
J. L. WEST.
APPARATUS FOR DISTRIBUTING AIR.
No. 571,500. Patented Nov. 17, 1896.
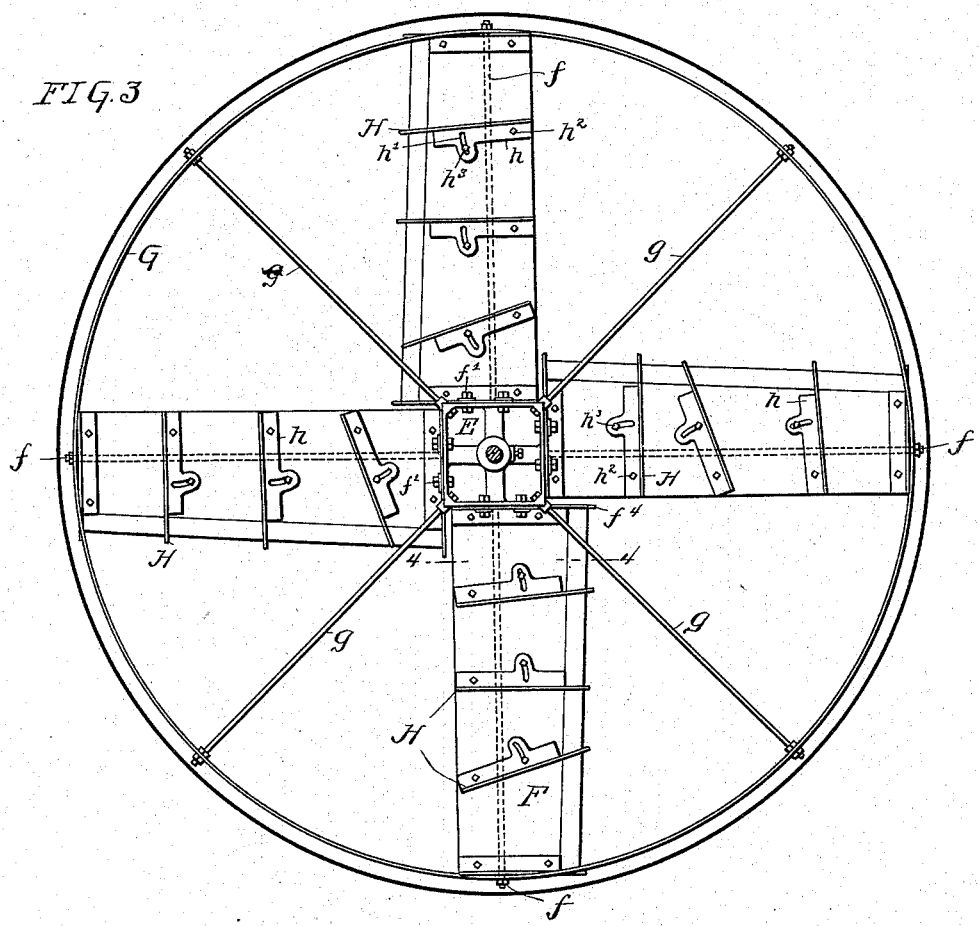
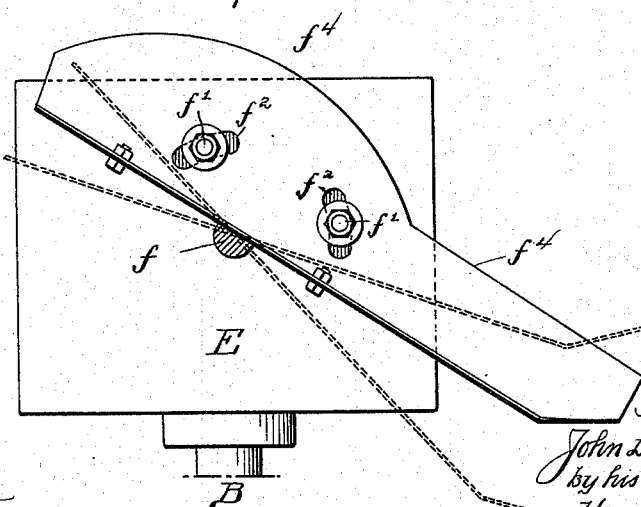

UNITED STATES PATENT OFFICE.

JOHN L. WEST, OF NORRISTOWN, PENNSYLVANIA.

APPARATUS FOR DISTRIBUTING AIR.

SPECIFICATION forming part of Letters Patent No. 571,500, dated November 17, 1896.

Application filed April 6, 1895. Serial No. 544,747. (No model.)

*To all whom it may concern:*

Be it known that I, JOHN L. WEST, a citizen of the United States, and a resident of Norristown, Montgomery county, State of Pennsylvania, have invented a certain new and Improved Process of and Apparatus for Distributing Air, of which the following is a full, clear, and exact description, reference being had to the accompanying drawings, forming part of this specification.

My invention has for its object the agitating, cutting, forcing, and directing of air by an artificial means into a room or chamber for drying, ventilating, preserving, and like purposes in such a manner that the air upon entering the chamber will diffuse itself in the nature of independent currents in all directions within the chamber, cutting and disturbing the air previously within the chamber and ramifying in such a manner throughout the chamber as to penetrate all parts before passing from the chamber through an outlet or duct provided for the purpose, imitating, as nearly as possible by artificial means, the natural currents of air in the open when disturbed by several conflicting currents centering from different directions.

In carrying out my invention the apparatus which I preferably employ has for its chief characteristics a series of radially-disposed arms axially provided upon a rotatable shaft, properly journaled, and small blades secured to or adjustable upon the radial arms at an angle to the face of the arm upon which they are respectively provided. Each arm may be provided with one or more blades, or, if desired, according to the extent of the result to be accomplished, the blades may be eliminated from one or more of the arms. The whole is centrally provided within a circular casing open at both ends and of an inner diameter slightly greater than the diameter of the radial arms.

By the rapid rotation of the radial arms the currents of air induced by the operation of the arms in this construction is subdivided into a number of smaller currents and the direction of travel of the same varied with the angle at which such smaller blades are respectively inclined, and by preference these smaller blades are so secured to the radial arms that they may be adjusted independently at different angles respectively to each other and to the blades, so as to energetically force these numerous currents, as the arms and blades rapidly revolve, in various and different directions into the drying or ventilating chamber into all portions of the same, said currents being so directed in their travel independently in different directions as to strike upon the walls of the chamber or against each other, rebounding and scattering, thus describing various and other lines of direction in such a manner as to produce within the chamber practically a vortex of air or whirlwind. It is clear that under these conditions the material provided in the chamber for purposes of treatment, whether for drying, ventilating, or preserving, &c., will be subjected on all sides to the force and action of the induced current, and that the air contained in the chamber will be thoroughly and constantly agitated by the continuously-incoming currents.

In the accompanying drawings I describe the preferred form of construction for carrying out my invention.

Figure 1 is a sectional elevation on the line 1 1, Fig. 2, of an apparatus for distributing air constructed in accordance with my invention and illustrating its application to a drying-room. Fig. 2 is a sectional elevation on the line 2 2, Fig. 1. Fig. 3 is a sectional plan view, on a somewhat larger scale, on the line 3 3, Fig. 1. Fig. 4 is a sectional elevation, on a large scale, of one of the radially-arranged fan-arms on the line 4 4, Fig. 3; and Fig. 5 is a detached perspective view of one of the fan-arms.

Referring to the drawings, A represents a well or chamber having an open upper end and having also an opening $a$ at the bottom of the well for the entrance of the air to the distributing apparatus. Centrally mounted within this well or chamber is a vertical shaft B, adapted to upper and lower bearings $b$ $b'$, and provided with a pulley-wheel B', over which passes a belt $b^2$, connected to any suitable source of power.

In the present instance the fan or distributing apparatus is illustrated as being employed for the purpose of forcing a current or currents of air into the drying-room of a laundry, and in Figs. 1 and 2, therefore, C represents an upper chamber forming the drying-room in which the clothing to be dried is placed.

At the top of the chamber C are a series of bars $c$, extending from the rear wall of the chamber to a supporting-bracket $c'$, some distance outside the front wall of the chamber, and on each of the rods $c$ is hung a drying-horse D, provided with supporting-wheels $d$, which run upon the rods $c$, and at its forward end is further provided a guiding-wheel $d'$, adapted to travel in a guiding slot or track $d^2$, formed in the floor of the building. On each of the horses D is a series of supporting rods or arms $d^3$, on which the clothes to be dried are hung, and at front each horse is provided with a handle $d^4$, by which it may be readily withdrawn from the chamber.

Secured to the vertical shaft B is a hub or center piece E in the form of a square block, provided in the present instance with four sides, to each of which is secured a radial arm F, the number of sides being increased to accommodate five or six or more blades if desired.

Each of the arms F is secured to a radial rod or bar $f$, arranged at the back of the arm and screwed or otherwise secured at one end into the center piece E, and at the opposite end is secured to a circumferential supporting-ring G. The rod $f$ forms an axis on which the arm F may turn, and when once adjusted to the desired position the arm is secured to the center piece by bolts $f'$, passing through segmental slots $f^2$ in end pieces $f^4$, which are secured to each of the arms F.

The forward lower edge of each arm F is bent at an angle to the main body of the arm, so as to act more effectively on the air, and by adjusting the angle of this arm to the plane of rotation the quantity of air acted upon will be increased or diminished in accordance with the degree of inclination given to the arm, its mean position being that illustrated by full lines in Fig. 4, while the dotted lines in the same figure illustrate the extreme angles to which it may be adjusted.

The circumferential ring G is secured to each of the rods $f$, and in order to strengthen and brace the blades a series of supporting or strengthening bars $g$ are provided between the circumferential ring and the center piece, as shown more clearly in Fig. 3.

On each of the arms F is secured a blade H, the blade having a right-angled flange $h$, in which is formed a segmental slot $h'$. Each blade H follows the contour of the arm F and extends from the face of said arm preferably at a right angle to said face, it being secured in position by an upper securing-bolt $h^2$, passing through the flange $h$ and the body of the arm, and a lower screwing-bolt $h^3$, extending through the segmental slot $h'$ and the body of the arm, the upper bolt serving as a pivot on which the blade may be moved to adjust its surface to any desired angle to its line of rotation and being then secured in its adjusted position by means of the bolt $h^3$.

In practice the blades H may each be adjusted at a right angle to the radial line in which the arms F extend, and as the arms revolve the currents of air induced will be cut into a series of concentric currents, which will theoretically be forced in a vertical line. This, however, would not act effectively to thoroughly agitate the air in the drying-chamber, and in order to produce this result the blades H are adjusted at varying angles, as illustrated, for instance, in Fig. 3, so that a large number of currents of air will be forced in different directions, and meeting and crossing each other will thoroughly and effectively keep the air in the drying-chamber in a constant state of agitation.

The present description being confined to the application of the device for use as a drier I find it desirable to employ immediately above the fan a series of steam-pipes I to heat the passing current of air, in order that it may act more effectively upon the clothing.

It will be understood that my invention is not limited to use in connection with a drying-chamber, as it may be employed for refrigerating or ventilating purposes, or in plants of any character where it is desirable to thoroughly agitate a large body of air.

Having thus described my invention, what I claim, and desire to secure by Letters Patent, is—

1. In a fan or apparatus for distributing air, the combination with a hub or central portion of a fan, of a series of radially-disposed arms centrally pivoted upon a radially-disposed axis and adjustably secured upon said axis with means for regulating the adjustment of each arm upon its axis and a series of blades extending across the upper face of said arms, substantially as described.

2. In a fan or apparatus for distributing air, the combination with the arm of a fan, of a blade extending across and at an angle to the plane of said arm, said blade being adjustable at different angles.

3. In an air-distributing apparatus, the combination of a rotatable hub, journaled in suitable bearings, radially-disposed arms adjustable at different angles thereon, blades secured to the upper face of said arms, said blades being adjustable upon said arms at an angle to said arms and to each other, substantially as described.

4. In a fan, the combination of the central hub, a surrounding strengthening-band, an inclosing casing, a series of radial rods or bars extending from the hub to said strengthening-band, adjustable arms secured to said rods, and blades secured to the upper face of said arms, substantially as specified.

5. In a fan, the combination of the hub, E, the circular ring, G, a series of rods, $f$, extending between the hub and ring, an arm, F, carried by each rod, $f$, an end piece, $f^4$, for each arm, having segmental slots, $f^2$, securing-bolts, $f'$, extending through said end pieces to secure the arms to the hub, a blade, H, a right-angled flange, $h$, thereon, having a segmental slot, $h'$, and securing-bolts, $h^2$, $h^3$, for fastening the blades to said arms, F, substantially as specified.

6. In a rotary fan the combination of a central hub, a surrounding strengthening-band, G, secured to said hub and radial arms, F provided between the hub and said strengthening-band adjustably secured in position and means for regulating the adjustment of the angle of the face of the respective arms and for holding the same in any desired position, and short blades adjustably secured across the upper face of said arms, substantially as described.

7. In a rotary fan short adjustable blades, H, adapted to the face of the radial arms of said fan, right-angle flanges, $h$, provided upon each blade having segmental slot, $h'$, securing-bolt, $h^3$, adapted to said slot and securing-bolt, $h^2$, for pivotally securing the blade to the arm, substantially as described.

8. In a rotary fan an adjustable radial arm, F, having the lower forward edge bent upward at an angle to the line of the main body of the arm, and short blades, H, adjustably secured upon the face of said arm having the right-angle flange, $h$, segmental slot, $h'$, therein, pivotal securing-bolt, $h^2$, and bolt, $h^3$, provided in said segmental slot, substantially as described.

In witness whereof I have hereunto set my hand this 22d day of March, A. D. 1895.

JOHN L. WEST.

Witnesses:
EDMUND S. MILLS,
HORACE PETTIT.